United States Patent
Peeke et al.

(10) Patent No.: US 6,901,202 B2
(45) Date of Patent: May 31, 2005

(54) STORAGE SYSTEM WITH A DISKLESS ENCLOSURE

(75) Inventors: Douglas E. Peeke, Shrewsbury, MA (US); Brian K. Bailey, Mendon, MA (US)

(73) Assignee: EMC Corporation, Hopkinton, MA (US)

( * ) Notice: Subject to any disclaimer, the term of this patent is extended or adjusted under 35 U.S.C. 154(b) by 365 days.

(21) Appl. No.: 10/255,291

(22) Filed: Sep. 26, 2002

(65) Prior Publication Data

US 2004/0062509 A1 Apr. 1, 2004

(51) Int. Cl.⁷ .................................................. G02B 6/00
(52) U.S. Cl. ...................................... 385/135; 385/147
(58) Field of Search ................................ 385/135–139, 385/147; 710/251, 302, 305; 711/112; 361/684, 685

(56) References Cited

U.S. PATENT DOCUMENTS

| | | | |
|---|---|---|---|
| 5,841,997 A | * 11/1998 | Bleiweiss et al. | 710/317 |
| 5,890,214 A | 3/1999 | Espy et al. | 711/114 |
| 5,901,151 A | 5/1999 | Bleiweiss et al. | 370/480 |
| 6,421,711 B1 | 7/2002 | Blumenau et al. | 709/213 |
| 6,425,049 B1 | 7/2002 | Yamamoto et al. | 711/112 |
| 2002/0044562 A1 | 4/2002 | Killen, Jr. et al. | 370/406 |
| 2002/0046276 A1 | 4/2002 | Coffey et al. | 709/224 |

* cited by examiner

Primary Examiner—Phan T. H. Palmer
(74) Attorney, Agent, or Firm—Guerin & Rodriguez, LLP; Michael A. Rodriguez (57) ABSTRACT

Described is a storage system that operates with a diskless enclosure. The diskless enclosure comprises a communication port connected to an arbitrated loop, a plurality of storage ports each being connectable to a disk module, and port bypass control circuitry. The port bypass control circuitry includes retimer circuitry for retiming communication signals passing through the communication port to and from the arbitrated loop. The port bypass control circuitry forwards retimed communication signals to the arbitrated loop without any storage port of the plurality of storage ports having a disk module connected thereto.

18 Claims, 5 Drawing Sheets

STORAGE SYSTEM WITH A DISKLESS ENCLOSURE

FIELD OF THE INVENTION

The invention relates generally to data storage systems that can be used in computer systems and computer networks. More particularly, the invention relates to a data storage system capable of operating with one or more diskless enclosures.

BACKGROUND

A typical data storage system includes one or more rack systems, each rack system having a plurality of storage devices or enclosures. A common topology in which the enclosures are connected is a loop. Communication signals traverse the loop uni-directionally and pass from enclosure to enclosure in a daisy-chain fashion. Enclosures receiving communication signals targeted to another enclosure forward those signals along the loop.

As communication signals traverse various media comprising the loop, such as copper cables, fiber optics, and printed circuit boards, the "data eye" of the signals, i.e., the region of valid data, tends to degrade due to attenuation and jitter (i.e., variations in the frequency or phase of the signals, due to varying time delays incurred on the media). Unless an enclosure compensates for the attenuation and jitter, the data eye can degrade to the point where the data value represented by the signal becomes erroneously interpreted (a bit error). Accordingly, industry has developed enclosures that amplify the communication signals and reduce jitter, relegating the task of improving or eliminating jitter to the disk modules within the enclosure.

Although this technique alleviates the problem of jitter, it also requires every enclosure within a data storage system to have at least one or, more often, two disk modules (one disk module for each direction in which the loop passes through the enclosure). In practice, users find even two disk modules inadequate because having only one disk module in each loop direction renders the storage system vulnerable to the failure of a single disk. Typically, storage systems permit hot swapping of disk modules, but hot-swapping the only disk module in a loop direction through the enclosure eliminated the only means for removing jitter. Thus, because of a single disk failing, the entire loop fails. To avoid this vulnerability, a user would necessarily install a full complement of disk modules to implement redundancy, and thus allow for hot-swapping. Consequently, this situation prevents users from configuring their storage systems with diskless enclosures, which is a need felt by users who want to configure their storage systems with expansion capabilities without having to fully populate the enclosures with disk modules, and still be able to test the loop connectivity and functionality of these enclosures.

SUMMARY

In one aspect, the invention features a storage system comprising a diskless storage device connected to a loop. The diskless storage device has a plurality of storage ports. Each storage port is connectable to a disk module that can store data. The diskless storage device operates to forward communication signals to the loop without any storage port of the plurality of storage ports having a disk module connected thereto.

In another aspect, the invention features a storage enclosure comprising a communication port connected to an arbitrated loop, a plurality of storage ports each being connectable to a disk module, and port bypass control circuitry. The port bypass control circuitry includes retimer circuitry for retiming communication signals that pass through the communication port to and from the arbitrated loop. The port bypass control circuitry forwarding retimed communication signals to the arbitrated loop without any storage port of the plurality of storage ports having a disk module connected thereto.

In another aspect, the invention features a storage enclosure comprising a communication port connected to an arbitrated loop and port bypass control circuitry. The port bypass control circuitry includes a retimer circuit electrically connected to the communication port. The retimer circuit has first and second retimers. The first retimer retimes communication signals that are received from the arbitrated loop through the communication port and the second retimer retimes communication signals that are forwarded to the communication port for transmission to the arbitrated loop.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Until the present invention, users of storage systems could not test the functionality of enclosures wired together in a loop topology in a storage system without installing disk modules in each of the enclosures. In brief overview, the present invention removes dependence on the disk modules to reduce or eliminate jitter, thus enabling such storage systems to operate with diskless enclosures.

Figure 1:
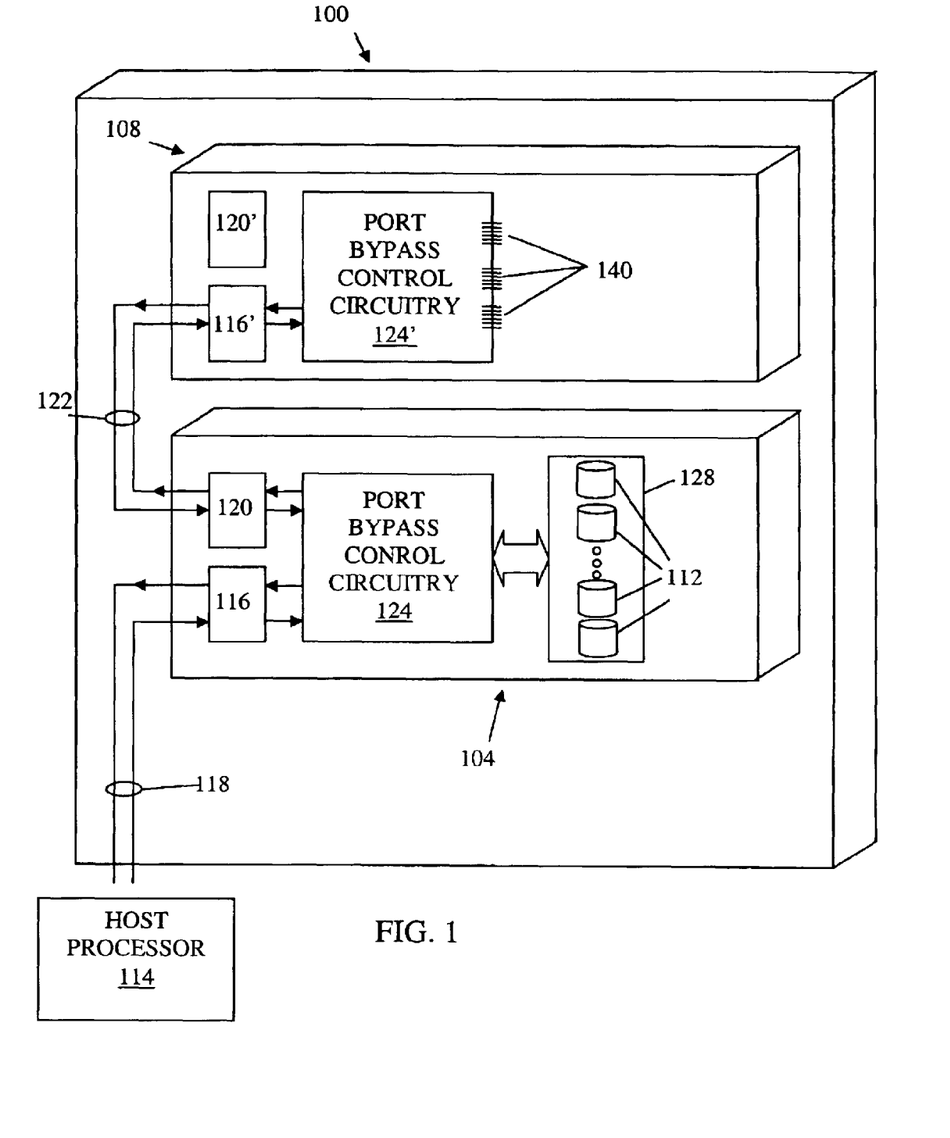
FIG. 1 is a diagram of an embodiment of a storage system including enclosures embodying the principles of the invention.

FIG. 1 shows an embodiment of a storage system 100 having a plurality of enclosures 104, 108 connected to each other in a single rack. In general, each enclosure 104, 108 is a storage device having a plurality of slots for inserting disk modules, one disk module per slot. Disk modules include a carrier assembly that holds a disk drive and slides into one of the slots of an enclosure. Examples of storage devices include disk-array enclosures (DAE) and disk-array processor enclosures (DPE). A typical DAE includes a plurality of disk modules (e.g., fifteen), one or two link control cards (LCCs), and one or two power supplies. A typical DPE includes one or two storage processors, one or two power supplies, and may include a plurality of disk modules (e.g., fifteen) and one or two LCCs. The disk modules can be used in many applications, for example, JBOD (Just a Bunch Of Disks), RAID (Redundant Array of Independent Disks), and SAN (Storage Area Network). The enclosures 104, 108 of the storage system 100 need not physically be in the same rack, but can be in separate racks.

In the illustrated embodiment, the enclosure 104 has a plurality of disk modules 112 and the enclosure 108 does not have any disk modules (i.e., the enclosure 108 is diskless). Embodiments of the storage system 100 have more than one enclosure with disk modules, more than one diskless enclosure, or both (i.e., more than one enclosure with disk modules and more than one enclosure without disk modules). The invention also enables the storage system 100 to operate with the diskless enclosure 108 as the only storage device in the rack.

A host processor 114 runs an operating system and uses the storage system 100 for data storage and retrieval. Although shown in FIG. 1 to be external to the storage system 100, in some embodiments the host processor 114 is internal to the storage system 100. The host processor 114 and enclosures 104, 108 are connected to each other in a loop topology in a daisy-chain fashion. Cable 118 connects the host processor 114 to the enclosure 104 and cable 122 connects the enclosure 104 to the diskless enclosure 108. Each cable 118, 122 includes two unidirectional paths in opposite directions. Starting from the host processor 114, one loop includes a forward path to the enclosure 104 over cable 118 and then to the diskless enclosure 108 from the enclosure 104 over cable 122, and a return path back to the enclosure 104 from the diskless enclosure 108 over the cable 122 and then to the host processor 114 from the enclosure 104 over cable 118. As described in more detail in FIG. 5 below, the loop also passes through the disk modules 112 installed in the enclosure 104.

In one embodiment, the loop topology is a Fibre Channel arbitrated loop. Fibre Channel is a computer communications protocol for communicating data signals at a data rate of up to 2 Gbps. In general, the Fibre Channel protocol provides an interface by which host processors (and servers) communicate with enclosures and with the disk modules installed within the enclosures. The Fibre Channel arbitrated loop supports one bidirectional point-to-point circuit between a source (e.g., host 114) and a target enclosure at a time. When such a circuit is established, each other enclosure in the loop repeats and retimes the signals as described in more detail below.

The enclosure 104 includes a primary port 116, an expansion port 120, port bypass control circuitry 124, and the disk modules 112 arranged in an array 128 (e.g., RAID). The primary and expansion ports 116, 120 provide hardware pathways by which communication signals pass into and out of the enclosure 104. Typically the primary and expansion ports 116, 120 and port bypass control circuitry 124 are part of a single control card (e.g., LCC). The enclosure 104 can have two such cards to implement redundancy.

The port bypass control circuitry 124 is electrically connected to the primary and expansion ports 116, 120 and to the disk modules 112. In general, the port bypass control circuitry 124 allows bypassing the expansion port 120 (and thus the enclosure 108 connected to the loop through the expansion port 120) and any one or all of the disk modules 112, thus allowing the enclosure 108 and disk modules 112 to be electronically removed from the loop while maintaining an operational loop.

Like the enclosure 104, the diskless enclosure 108 includes a primary port 116', an expansion port 120' and port bypass control circuitry 124'. The diskless enclosure 108 also includes a plurality of unused storage ports 140. Each storage port 140 is connectable to a disk module. As shown, no disk modules are installed.

To form the arbitrated loop described above, the cable 118 connects the primary port 116 of the enclosure 104 to the host processor 114 and the cable 122 connects the expansion port 120 of the enclosure 104 to the primary port 116' of the diskless enclosure 108. In the illustrated embodiment, there are no other enclosures in the loop and thus the expansion port 120' of the diskless enclosure 108 is bypassed by the port bypass control circuitry 124'. If there is another enclosure in the loop, that enclosure can be connected to the diskless enclosure 108 through the expansion port 120' and be diskless or have disk modules.

During operation of the storage system 100 communication signals pass among the host processor 114 and the enclosures 104, 108 and through the disk modules 112. The communication signals can be, for example, Fibre Channel signals. Other types of signals can be used without departing from the principles of the invention. When traversing the cables 118, 122 and passing through the enclosures 104, 108, the signals, in general, become attenuated and noisy from increasing jitter. The attenuation and jitter can degrade the signals, thus corrupting data and causing errors.

Because of the deleterious effects of attenuation and jitter, it is desirable to improve the signals by amplifying the signals and removing jitter. Each port bypass control circuitry 124, 124' (generally, port bypass control circuitry 124) amplifies the signals and removes jitter from the signals (referred to as retiming or repeating), in accordance with the principles of the invention, such that diskless operation within an enclosure becomes possible. In general, port bypass control circuitry 124 of the present invention retimes signals at any one or combination of the following locations within a control card: 1) upon receiving signals from the primary port 116 and before passing such signals to the disk array 128, if any; 2) upon receiving signals from the expansion port 120 and before forwarding such signals towards the primary port 116; 3) before forwarding signals to the expansion port 120 for transmission over a cable to an enclosure; and 4) before forwarding signals to the primary port 116 for transmission over a cable to an enclosure or the host processor 114.

In addition to the retiming performed by the port bypass control circuitry 124, for enclosures with disk modules 112, such as enclosure 104, the disk modules 112 retime the signals.

Figure 2:
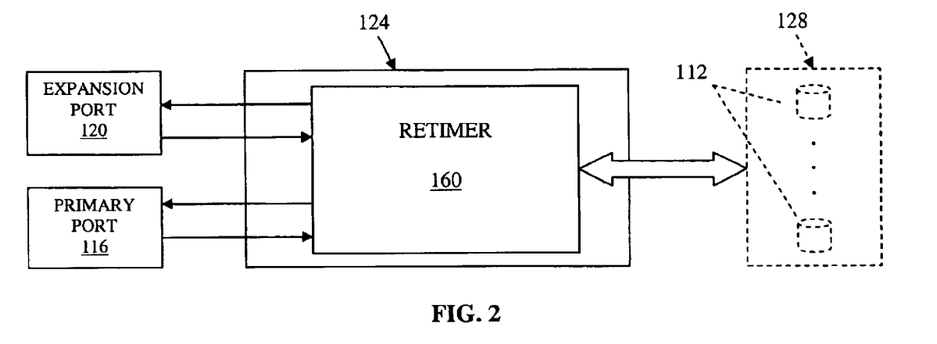
FIG. 2 is a diagram of an embodiment of port bypass control circuitry including a retimer/repeater.

FIG. 2 shows an embodiment of the port bypass control circuitry 124 of FIG. 1 including a retimer 160 that is disposed between the primary and expansion ports 116, 120. The retimer 160 is also disposed between each of the primary and expansion ports 116, 120 and the array 128 of disk modules 112. In general, a retimer retimes the signal using an independent local clock to ensure compliance with the signal specifications (e.g., Fibre Channel).

In one embodiment, the retimer 160 includes a repeater. and a A repeater retimes amplifies the signal using a clock recovered from the signal, reduces the amount of jitter re-transmitted and has less latency than a retimerand thus opens the data eye of the signal in amplitude. In this embodiment, the retimer 160 operates both as a retimer and a repeater to improve jitter and increase signal amplitude to minimize latency.

The port bypass control circuitry 124 is representative of port bypass control circuitry of the present invention in general. For instance, the port bypass control circuitry 124' of the diskless enclosure 108 (FIG. 1) is similar to the port bypass control circuitry 124 of the enclosure 104, except that the diskless enclosure 108 does not have a disk array 128 with installed disk modules 112 with which to communicate. In FIG. 2, the disk array 128 and disk modules 112 are shown in phantom to indicate that these components are not present in a diskless enclosure such as enclosure 108.

Referring to FIG. 1 and FIG. 2, consider for example that the host processor 114 targets a communication to one or more of the disk modules 112. The host processor 114 sends signals representing the communication over the cable 118 which arrive at the primary port 116 of the enclosure 104. From the primary port 116, the signals pass to the retimer 160 of the port bypass control circuitry 124, which retimes and, for this example, repeats the signals before forwarding the signals to the disk array 128. Accordingly, the disk modules 112 are part of the loop that originates with the host processor 114.

After receiving the retimed signals, the targeted disk module 112 produces signals representing a response. These response signals pass to the retimer 160 of the port bypass control circuitry 124, which passes the signals to each successive disk in the disk module 112, and then repeats and retimes the response signals before forwarding the signals to the expansion port 120.

From the expansion port 120, the response signals traverse the cable 122 to reach the primary port 116' of the diskless enclosure 108. From the primary port 116', the response signals pass to the retimer/repeater (not shown) of the port bypass control circuitry 124', which retimes the response signals at least once before returning the signals to the primary port 116' (provided there are no other enclosures connected to the expansion port 120'). Consequently, although no disk modules are installed, the port bypass control circuitry 124' of the diskless enclosure 108 operates to reduce or eliminate jitter so that data eye of each signal meets the appropriate signal specifications (e.g., Fibre Channel) for the return path through the loop. The retimer/repeater can also repeat the signals at least once.

From the primary port 116', the response signals return to the expansion port 120 of the enclosure 104 over the cable 122 and then to the retimer 160 of the port bypass control circuitry 124 of the enclosure 104. The retimer 160 of the port bypass control circuitry 124 retimes the response signals at least once before sending the signals to the host processor 114 through the primary port 116.

Figure 3:
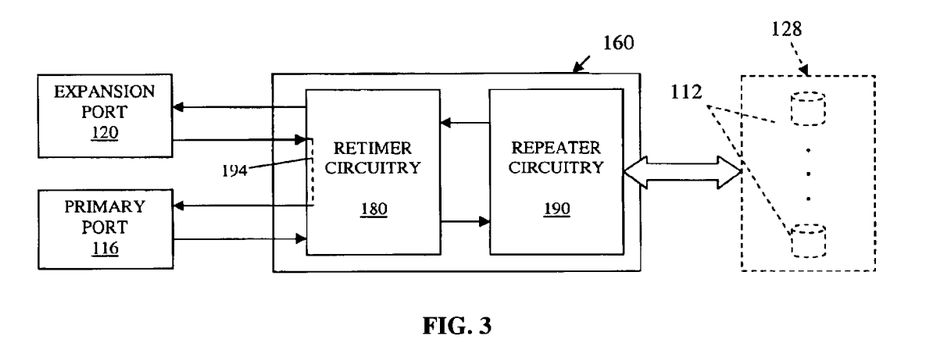
FIG. 3 is a diagram of an embodiment of the retimer/repeater of FIG. 2 including retimer circuitry and repeater circuitry.

FIG. 3 shows an embodiment of the retimer 160 of FIG. 2, including retimer circuitry 180 and repeater circuitry 190. The retimer circuitry 180 is in communication with the primary and expansion ports 116, 120 to retime signals upon receiving and before transmitting such signals to another enclosure or to the host processor 114. The repeater circuitry 190 is in communication with the array 128 of disk modules 112 and with the retimer circuitry 180.

This embodiment illustrates that the retimer circuitry 180 and repeater circuitry 190 can be separate circuits. The retimer circuitry 180 interfaces the primary and expansion ports 116, 120 to retime signals as signals arrive and as signals leave the enclosure 104. Similarly, the repeater circuitry 190 interfaces the disk array 128 to reduce jitter on signals as signals enter and exit the disk modules 112. The retimer circuitry 180 is also in communication with the repeater circuitry 190 through which the retimer circuitry 180 forwards signals received from the primary port 116 to the disk array 128 and forwards signals received from the disk array 128 to the expansion port 120. A path 194 within the retimer circuitry 180 conveys signals arriving from the expansion port 120 directly to the primary port 116 (without having to traverse paths through the repeater circuitry 190 and the disk array 128).

Figure 4:
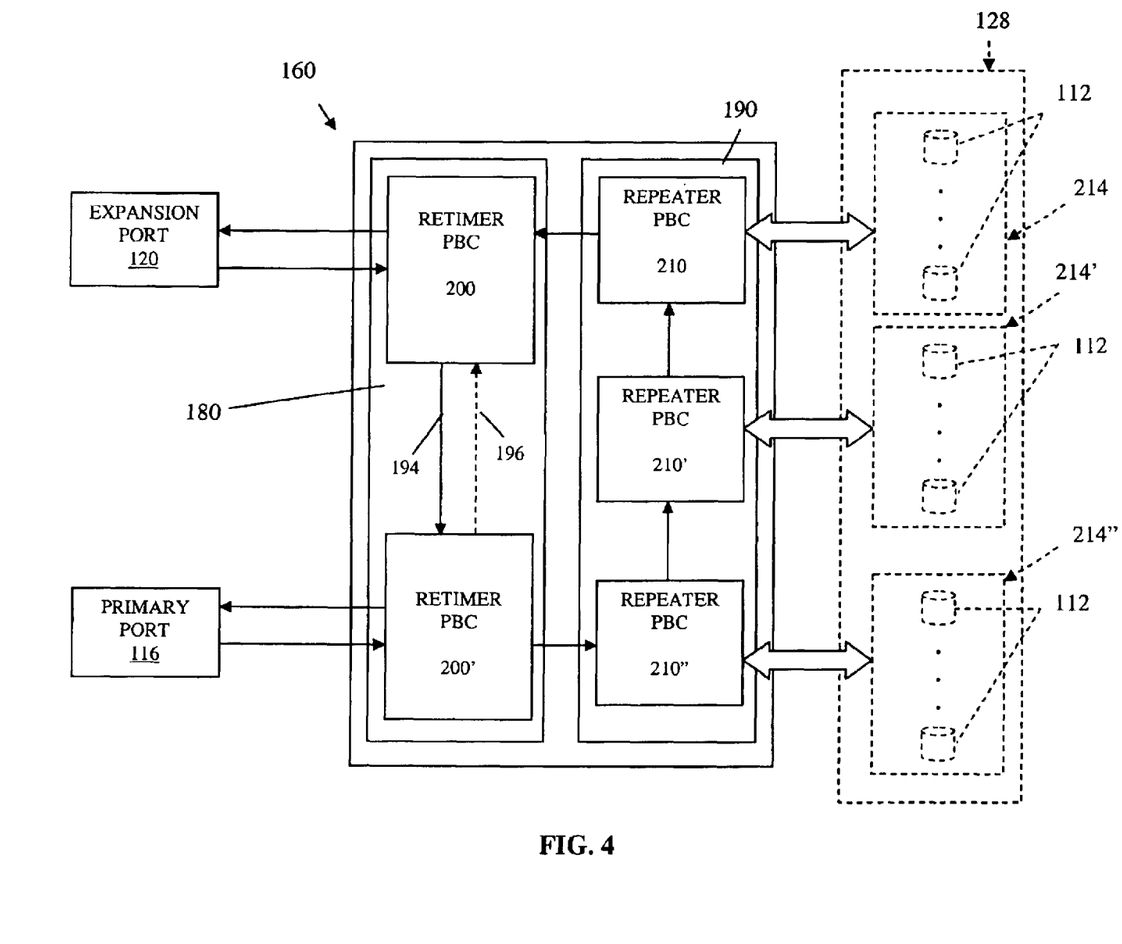
FIG. 4 is a diagram of an embodiment of the retimer circuitry of FIG. 3 and an embodiment of the repeater circuitry of FIG. 3.

FIG. 4 shows an embodiment of the retimer circuitry 180 and an embodiment of the repeater circuitry 190 of FIG. 3. The retimer circuitry 180 includes a first retimer port bypass circuit (PBC) 200 in communication with the expansion port 120 and a second retimer port bypass circuit (PBC) 200' in communication with the primary port 116. Each retimer PBC 200, 200' retimes signals as signals arrive from and before signals pass to a respective port. The first retimer PBC 200 is in communication with the second retimer port bypass circuit 200' over the communication path 194 to provide a direct path between the retimer PBC 200, 200' for forwarding communication signals arriving at the retimer 160 over the expansion port 120.

The repeater circuitry 190 includes a first repeater PBC 210, a second repeater PBC 210', and a third repeater PBC 210" (generally, repeater PBC 210). Each repeater PBC 210 is in communication with a respective subset 214, 214', 214" (generally, subset 214) of the disk modules 112. In one embodiment, each subset 214 includes five disk modules. The subsets of disk modules 112 are shown in phantom to indicate that these subsets 214 of disk modules 112 are absent in a diskless enclosure such as enclosure 108. The first repeater PBC 210 is in communication with the first retimer PBC 200, and the third repeater PBC 210" is in communication with the second retimer PBC 200'.

Communication signals entering an enclosure (104 or 108) through the primary port 116 pass to the retimer PBC 200', which retimes and forwards the signals to the third repeater PBC 210". If no disk modules are installed in the enclosure (e.g., enclosure 108), each repeater 210 repeats and forwards the signals to the next PBC (210 or 200) in the loop. In one embodiment, if the enclosure has no disk modules, the retimer PBC 200' forwards the signals (over communication path 196, shown as a dashed line) without the signals passing through the series of repeater PBCs 210", 210 and 210.

If disk modules are installed in the enclosure, the third repeater PBC 210" communicates with each of the disk modules 112 in the subset 214", repeating the signals at least once before passing the signals to the second repeater PBC 210'. In one embodiment, each repeater PBC 214 repeats the signals before passing signals to a first one of the disk modules in the subset 214 connected thereto and then again before passing signals to the next repeater PBC 210 or retimer PBC 200.

Upon receiving the signals from the third repeater PBC 210", the second repeater PBC 210' communicates with each of the disk modules 112 in the subset 214', and repeats the signals at least once before passing the signals to the first repeater PBC 210. Similarly, the first repeater PBC 210 communicates with each of the disk modules 112 in the subset 214, and repeats the signals at least once before passing the signals to the first retimer PBC 200.

When the first retimer PBC 200 receives the signals from the repeater PBC 210, the first retimer PBC 200 retimes the signals and forwards the signals to the expansion port 120, if there is another enclosure connected in the loop, or, if there is no other enclosure connected in the loop, to the second retimer PBC 200' over the communication path 194.

Figure 5:
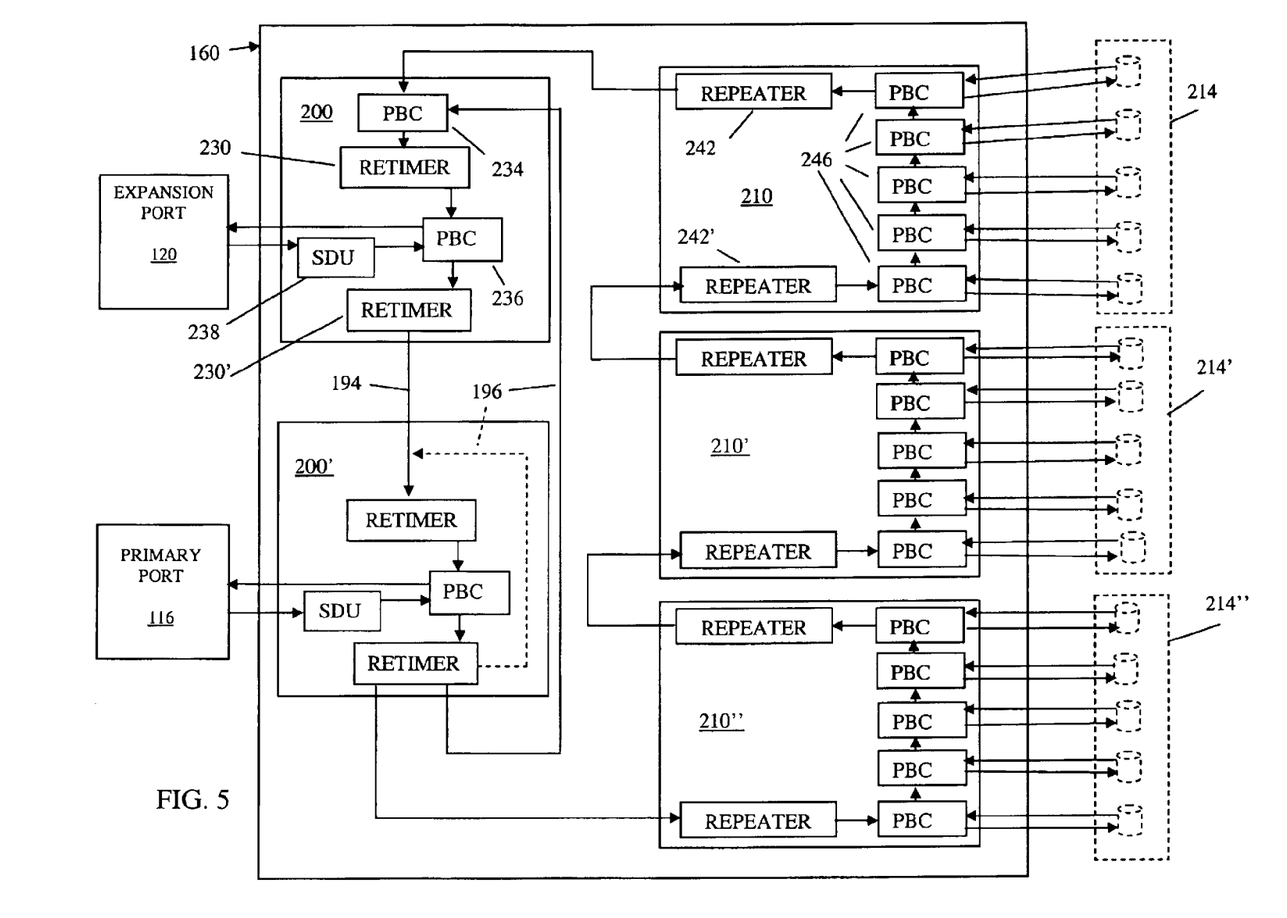
FIG. 5 is a diagram of the retimer circuitry and repeater circuitry of FIG. 4 in more detail.

FIG. 5 shows detailed embodiments of each retimer PBC 200 and each repeater PBC 210 of FIG. 4. Each retimer PBC 200, 200' includes first and second retimers 230, 230' (generally, retimer 230), first and second port bypass circuits (PBC) 234, 236 and a signal detect unit (SDU) 238. In one embodiment (shown in FIG. 5), the retimer PBC 200' does not have the first PBC 234. Each repeater PBC 210, 210', 210" includes first and second repeaters 242, 242' (generally, repeater 242) and a plurality of port bypass circuits 246.

For the purposes of simplifying the illustration, reference numerals for the retimers 230, repeaters 242, and port bypass circuits 234, 236, 246 appear in FIG. 5 for the retimer PBC 200 and repeater PBC 210 only. It is to be understood that the other retimer and repeater PBCs 200', 210', 210" have similar features that have similar reference numerals as the retimer PBC 200 and repeater PBC 210, although the numerals do not appear in the drawing.

In one embodiment, each retimer PBC 200, 200' and repeater PBC 210, 210', 210" is implemented by a six port bypass circuit chip (e.g., an integrated circuit no. VSC7147, manufactured by Vitesse Semiconductor Corporation of Camarillo, Calif.).

Referring to retimer PBC 200 as a representative example of the retimer PBCs 200 200', the first PBC 234 includes two input terminals. By one input terminal the first PBC 234 receives signals over communication path 196 from the second retimer 230' of the second retimer PBC 200'. As described above, in one embodiment the enclosure uses the communication path 196 to circumvent the repeater PBCs 210, 210', and 210" when there are no disk modules installed. Alternatively (dashed arrow), the communication path 196 passes to the first retimer 230 of the retimer PBC 200' when the expansion port is not used. By the other input terminal, the first PBC 234 receives signals from the first repeater 242 of the repeater PBC 210. Signals received by the first PBC 234 pass to the first retimer 230, which retimes and forwards the retimed signals to the second PBC 236.

The SDU 238 also forwards signals to the second PBC 236, in particular, those signals received from the expansion port 120 (or, in the case of retimer PBC 200', from the primary port 116). The SDU 238 determines whether a cable with a valid signal is connected to the enclosure.

The second PBC 236 forwards the retimed signals received from the first retimer 230 to the expansion port 120 (or, for the retimer PBC 200', to the primary port 116). The SDU passes signals to the PBC 236 as described above.

The second retimer 230' then retimes and forwards the signals to the retimer 230 of the second retimer PBC 200' by way of the communication path 194 (or, for the retimer PBC 200', to the second repeater 242' of the repeater PBC 210").

Referring to repeater PBC 210 as a representative example of the repeater PBCs 210, 210', and 210", the second repeater 242' receives signals from the first repeater 242 of a adjacent repeater PBC (or, for repeater PBC 210", retimed signals from the retimer 230' of the retimer PBC 200') and forwards the signals to the first in a series of PBCs 246. Each PBC 246 is configured to communicate with one of the disk modules 112 when that disk module is installed in the enclosure. In FIG. 5, the disk modules are shown in phantom to indicate that such components are absent from diskless enclosures such as enclosure 108.

When disk modules 112 are not present in an enclosure, each PBC 246 forwards the signals to the next PBC 246 in the series, the last PBC 246 in the series forwarding the signals to the first repeater 242. The first repeater 242 sends the signals to the retimer PBC 200 (or, for the repeater PBCs 210' and 210", to the second repeater 242' of the next repeater PBC).

Other embodiments of diskless enclosures and enclosure with disks configure the retimer PBCs 200 and repeater PBCs 210 differently than that shown in FIG. 5 so as to perform the retiming and repeating at different locations within the port bypass control circuitry 124. For example, in one embodiment illustrated generally by FIG. 6, each retimer PBC 200, 200' includes the first and second retimers 230, 230' and each repeater PBC 210, 210', 210" includes the second repeater 242' as described in FIG. 5. How this embodiment differs from that in FIG. 5 is that the first repeaters 242 of the repeater PBCs 210, 210' and 210" in FIG. 5 are retimers in FIG. 6.

Figure 6:
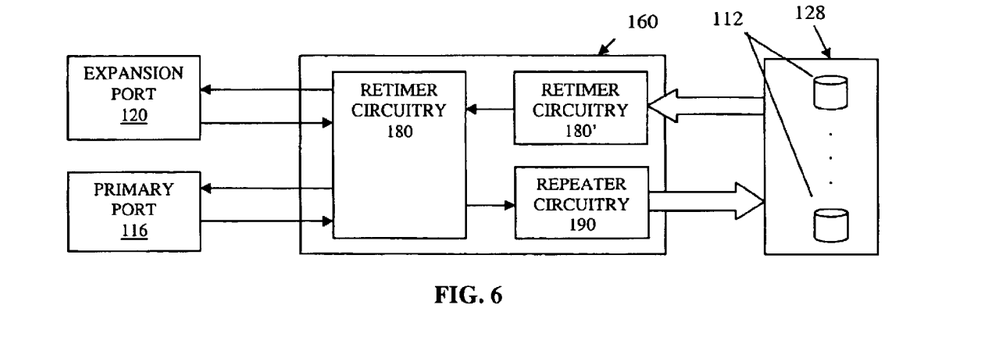
FIG. 6 is a diagram of another embodiment of the retimer/repeater of FIG. 2.

Accordingly, in this embodiment, retiming circuitry 180 retimes communication signals when the signals enter and exit the port bypass control circuitry 124 through the primary and expansion ports 116, 120 and the retiming circuitry 180' retimes communication signals after the signals completely pass through the series of PBCs 246 (and before the signals pass to the repeater circuitry 190 or to the retimer circuitry 180). The repeater circuitry 190 repeats communication signals before the signals pass to the first PBC 246 in the series of PBCs 246.

Figure 7:
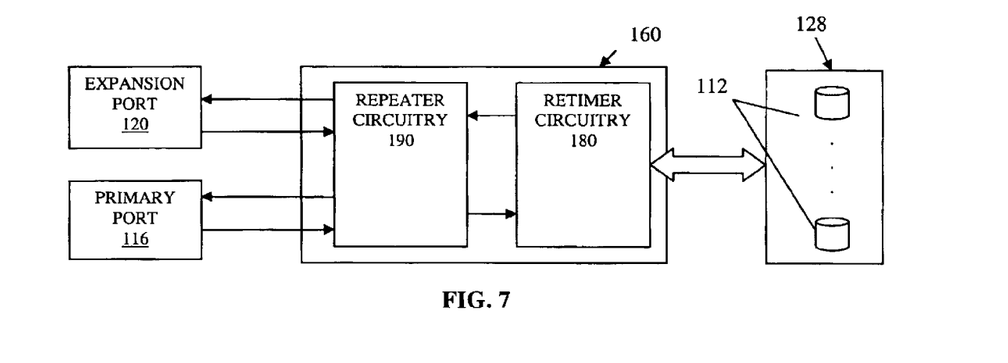
FIG. 7 is a diagram of another embodiment of the retimer/repeater of FIG. 2.

In another embodiment illustrated generally by FIG. 7, the retimer PBCs 200, 200' of FIG. 5 are repeater PBCs in FIG. 7 and the repeater PBCs 210, 210', 210" of FIG. 5 are retimer PBCs in FIG. 7. In this embodiment, repeating occurs when communication signals enter and exit the port bypass control circuitry 124 through the primary and expansion ports 116, 120, and retiming occurs when the communication signals enter and exit the series of PBCs 246.

Figure 8:
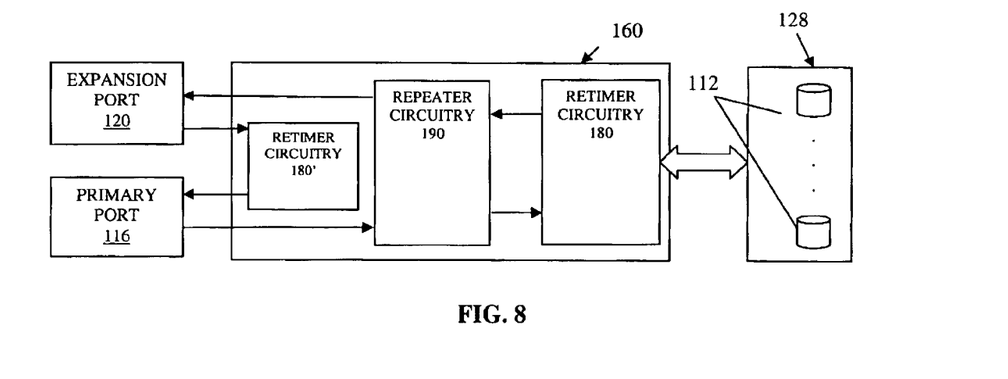
FIG. 8 is a diagram of another embodiment of the retimer/repeater of FIG. 2.

In the embodiment of FIG. 7, communication signals traversing the return path through the loop are not retimed because the signals pass from the expansion port 120 to the primary port 116 over path 194 without passing through a retimer. If it is desired to ensure that signals are retimed on the return path, either or both of the PBCs 200, 200' include a retimer (i.e., either the second retimer 230' of PBC 200, the first retimer 230 of PBC 200', or both) This modification to the embodiment of FIG. 7 is illustrated generally by FIG. 8.

While the invention has been shown and described with reference to specific preferred embodiments, it should be understood by those skilled in the art that various changes in form and detail may be made therein without departing from the spirit and scope of the invention as defined by the following claims. For example, more or fewer than two retimer or three repeater PBCs 200, 210, and more or fewer than two retimers 230 or repeaters 242 within each PBC 200, 210 can be used without departing from the principles of the invention. Modifications to the location of the repeaters 242 relative to the disk modules 112, for example, so that repeating and/or retiming occurs between PBCs 246 also do not depart from the principles of the invention.

What is claimed is:

1. A storage system, comprising:
   a diskless storage device connected to a loop, the diskless storage device having a plurality of storage ports, each storage port of the plurality of storage ports being connectable to a disk module that can store data, the diskless storage device operating to forward communication signals to the loop without any storage port of the plurality of storage ports having a disk module connected thereto.

2. The storage system of claim 1, wherein the diskless storage device includes a communication port through which the diskless storage device receives the communication signals, the diskless storage device retiming the communication signals upon receiving the communication signals through the communication port.

3. The storage system of claim 2, wherein the communication port is a primary port and the second communication port is an expansion port.

4. The storage system of claim 1, wherein the diskless storage device includes port bypass control circuitry that retimes the communication signals before the diskless storage device forwards the communication signals.

5. The storage system of claim 1, wherein the diskless storage device includes a communication port through which the diskless storage device receives the communication signals, the diskless storage device retiming the communication signals before forwarding the communication signals to the communication port.

6. The storage system of claim 1, wherein the storage device is a first storage device, and further comprising a second storage device connected to the first storage device in a loop topology.

7. The storage system of claim 1, wherein the storage device is a disk array enclosure.

8. The storage system of claim 1, wherein the communication signals are Fibre Channel signals.

9. A storage enclosure, comprising:
a communication port connected to an arbitrated loop;
a plurality of storage ports each being connectable to a disk module; and
port bypass control circuitry including retimer circuitry for retiming communication signals passing through the communication port to and from the arbitrated loop, the port bypass control circuitry forwarding retimed communication signals to the arbitrated loop without any storage port of the plurality of storage ports having a disk module connected thereto.

10. The storage enclosure of claim 9, wherein the communication port is one of a primary port and an expansion port.

11. The storage enclosure of claim 9, wherein the port bypass control circuitry retimes communication signals received from a disk module.

12. The storage enclosure of claim 9, wherein the port bypass control circuitry retimes communication signals before sending the communication signals to a disk module.

13. The storage enclosure of claim 9, wherein the port bypass control circuitry includes repeater circuitry for repeating the communication signals.

14. The storage enclosure of claim 9, wherein the port bypass control circuitry retimes communication signals before forwarding the communication signals to the communication port for transmission over the arbitrated loop.

15. A storage enclosure, comprising:
a communication port connected to an arbitrated loop; and
port bypass control circuitry including a retimer circuit electrically connected to the communication port,
the retimer circuit having first and second retimers, the first retimer retiming communication signals that are received from the arbitrated loop through the communication port and the second retimer retiming communication signals that are forwarded to the communication port for transmission to the arbitrated loop.

16. The storage enclosure of claim 15, further comprising a second communication port connected to the arbitrated loop, and wherein the port bypass control circuitry includes a second retimer circuit electrically connected to the second communication port, the second retimer circuit having first and second retimers, the first retimer of the second retimer circuit retiming communication signals that are received from the second communication port and the second retimer of the second retimer circuit retiming communication signals that are forwarded to the second communication port for transmission to the arbitrated loop.

17. The storage enclosure of claim 16, wherein the first and second retimer circuits are electrically connected to each other to provide a direct path between the communication ports.

18. The storage enclosure of claim 15, further comprising a plurality of storage ports each being connectable to a disk module, the port bypass control circuitry forwarding retimed communication signals to the arbitrated loop without any storage port of the plurality of storage ports having a disk module connected thereto.

* * * * *